United States Patent [19]

Beeson

[11] Patent Number: 4,549,446
[45] Date of Patent: Oct. 29, 1985

[54] MOTORIZED VALVE ACTUATOR

[75] Inventor: Charles F. Beeson, Goshen, Ind.

[73] Assignee: Johnson Service Company, Milwaukee, Wis.

[21] Appl. No.: 577,193

[22] Filed: Feb. 6, 1984

[51] Int. Cl.[4] ............................................. F16K 31/05
[52] U.S. Cl. ................... 74/625; 251/129.03; 137/270
[58] Field of Search ................ 251/130, 14; 137/270; 74/625

[56] References Cited

U.S. PATENT DOCUMENTS

| | | | |
|---|---|---|---|
| 2,327,980 | 8/1943 | Bryant | 74/625 X |
| 2,954,703 | 10/1960 | Morrell | 251/130 X |
| 3,073,334 | 1/1963 | De Fays | 137/269 |
| 3,515,250 | 6/1970 | Cantalupo | 251/130 X |
| 4,046,350 | 9/1977 | Massey et al. | 137/269 X |
| 4,429,591 | 2/1984 | Zuch et al. | 251/130 X |

OTHER PUBLICATIONS

Penn Controls, Operating Instructions, Series Y20, Valve Linkage Set, pp. 1 and 2, Apr. 1976.
Honeywell, Tradeline, Q618A Valve Linkage, Assembly Instructions, FIGS. 1 and 2, Jan. 1970.

*Primary Examiner*—Arnold Rosenthal
*Attorney, Agent, or Firm*—Larry L. Shupe; Joseph J. Jochman, Jr.; John Phillip Ryan

[57] ABSTRACT

In general, a motorized valve actuator includes an electric drive motor having a rotatable shaft for providing an actuating torque. An output member is provided for operating a valve to be coupled thereto and a gear member is adapted to be mounted intermediate the shaft and the output member and in a first position or in a second position. The gear member includes first means for driving coupling of the motor shaft and the output member when the gear member is mounted in the first position and second means for decoupling the output member from the shaft when the gear member is mounted in the second position. In the latter position, the gear member permits the output member to be driven by a source of power external to the actuator.

13 Claims, 12 Drawing Figures

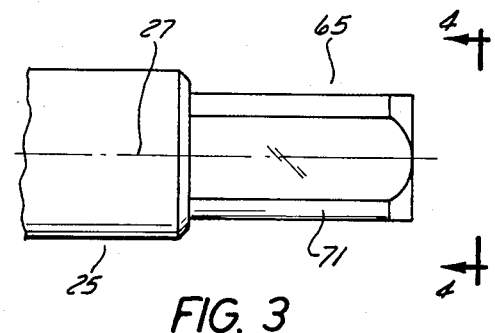
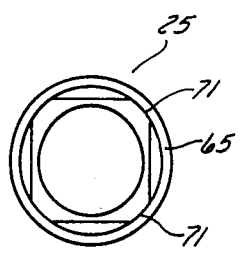
FIG. 3  FIG. 4
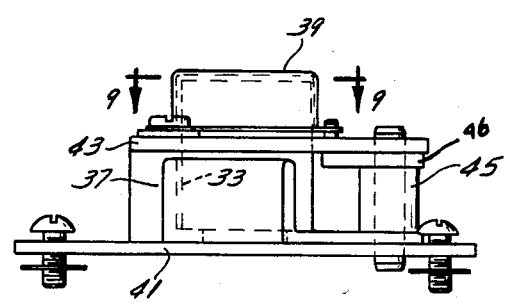
FIG. 5
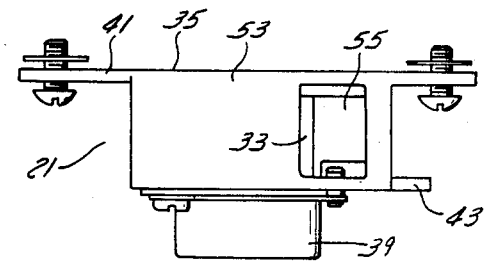
FIG. 6 ic valve actuators and more particularly, to an actuator having a manual adjustment feature and a feature permitting either of two directions of valve operation for a given direction of motor rotation.

MOTORIZED VALVE ACTUATOR

This invention relates generally to motorized valve actuators and more particularly, to an actuator having a manual adjustment feature and a feature permitting either of two directions of valve operation for a given direction of motor rotation.

Motorized valve actuators are in wide use within process control systems for controlling the position of valves connected to fluid conducting pipes. One application for actuators of this type is in heating, ventilating and air conditioning (HVAC) systems where such actuators are used to position valves for regulating the flow of heated or chilled water within a heat exchanger. The air passing through the exchanger is thereby heated or cooled for occupant comfort as required. Valve positioning is in a continuum from the fully opened to the fully closed position for best HVAC control.

One example of such an actuator is shown on page 3 of sheets entitled PENN CONTROLS SERIES Y 20. This actuator includes a rack and pinion mechanism for converting rotary motor torque into a linear force for valve stem movement. A disadvantage of this actuator is that no provision is included for simple, manual valve positioning in the event of a motor failure and, further, the illustrated actuator is capable of providing valve stem movement in only one direction for a particular direction of motor rotation. Other examples of motorized valve actuators are shown at page 1 of the aforementioned PENN CONTROLS sheet and in a sheet entitled HONEYWELL Q618A VALVE LINKAGE. These actuators employ a motor-driven eccentric cam for imparting linear movement to a valve stem. A limitation of actuators of this type is that the maximum stem travel is limited by the difference between the maximum and minimum radii of eccentricity. Additionally, such actuators are difficult to adapt to a manual positioning mode in the event of motor failure.

While these known devices have heretofore been satisfactory, they have failed to appreciate the manner in which a motorized valve actuator may be constructed to readily provide manual valve positioning and to permit valve stem movement in either of two directions with but a single direction of motor rotation.

SUMMARY OF THE INVENTION

In general, a motorized valve actuator includes an electric drive motor having a rotatable shaft for providing an actuating torque. An output member is provided for operating a valve to be coupled thereto and a gear member is adapted to be mounted intermediate the shaft and the output member and in a first position or in a second position. The gear member includes first means for driving coupling of the motor shaft and the output member when the gear member is mounted in the first position and second means for decoupling the output member from the shaft when the gear member is mounted in the second position. In the latter position, the gear member permits the output member to be driven by a source of power external to the actuator.

It is an object of the present invention to provide a valve actuator having a gear member adapted to be mounted in a first or in a second position.

Another object of the present invention is to provide an actuator having means for permitting its output member to be manually driven and positioned by a source of external power.

Still another object of the present invention is to provide an actuator adaptable to move a valve stem in either of two directions with but a single direction of motor rotation.

Still another object of the present invention is to provide an actuator which may be simply adjusted upon initial installation. How these and other objects of the invention are accomplished will become more apparent from the detailed description thereof taken with the accompanying drawing.

DESCRIPTION OF THE DRAWING

FIG. 3 is a side elevation view of the actuator motor shaft with a portion broken away;

FIG. 4 is a front elevation view of the shaft taken along the plane 4—4 of FIG. 3;

FIG. 5 is a bottom view of the actuator linkage bracket taken along the plane 5—5 of FIG. 1;

FIG. 6 is a top view of the actuator linkage bracket taken along the plane 6—6 of FIG. 1;

DESCRIPTION OF A PREFERRED EMBODIMENT

Figure 1:
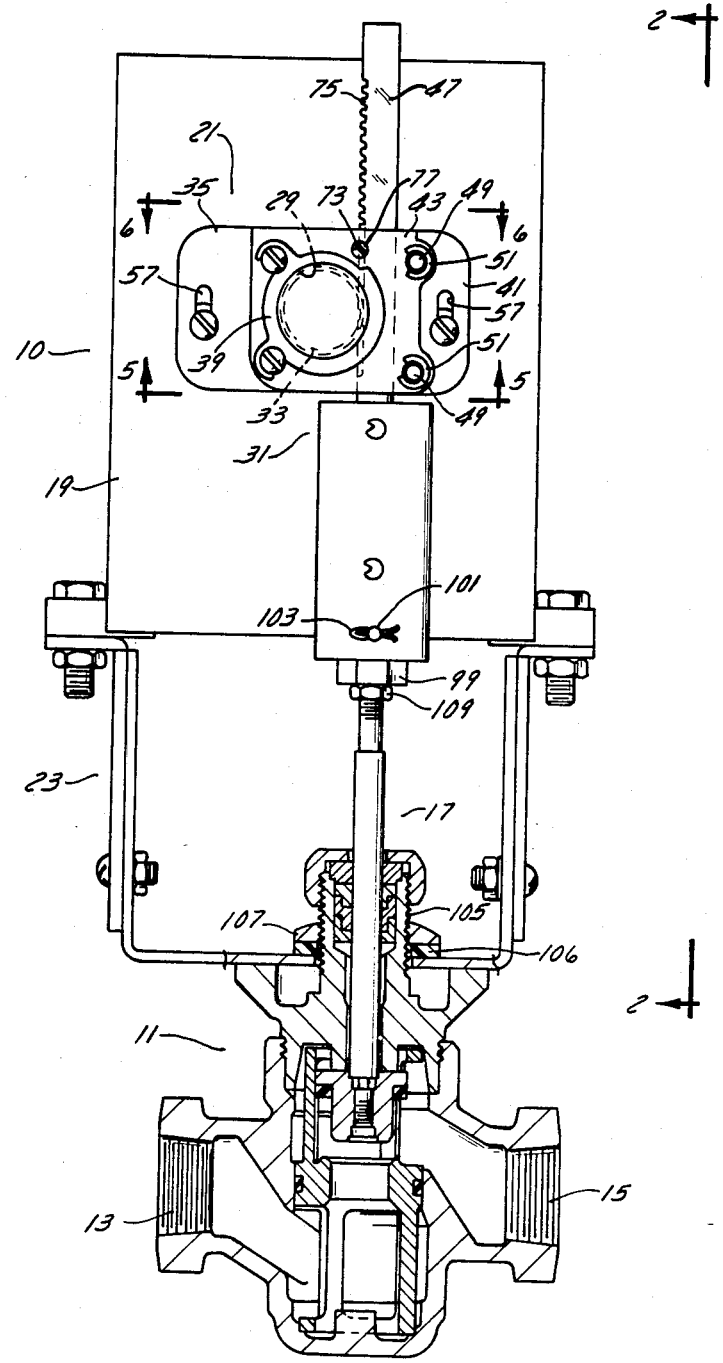
FIG. 1 is a front elevation view of the actuator of the present invention shown in conjunction with a fluid flow control valve to be actuated thereby.
Figure 2:
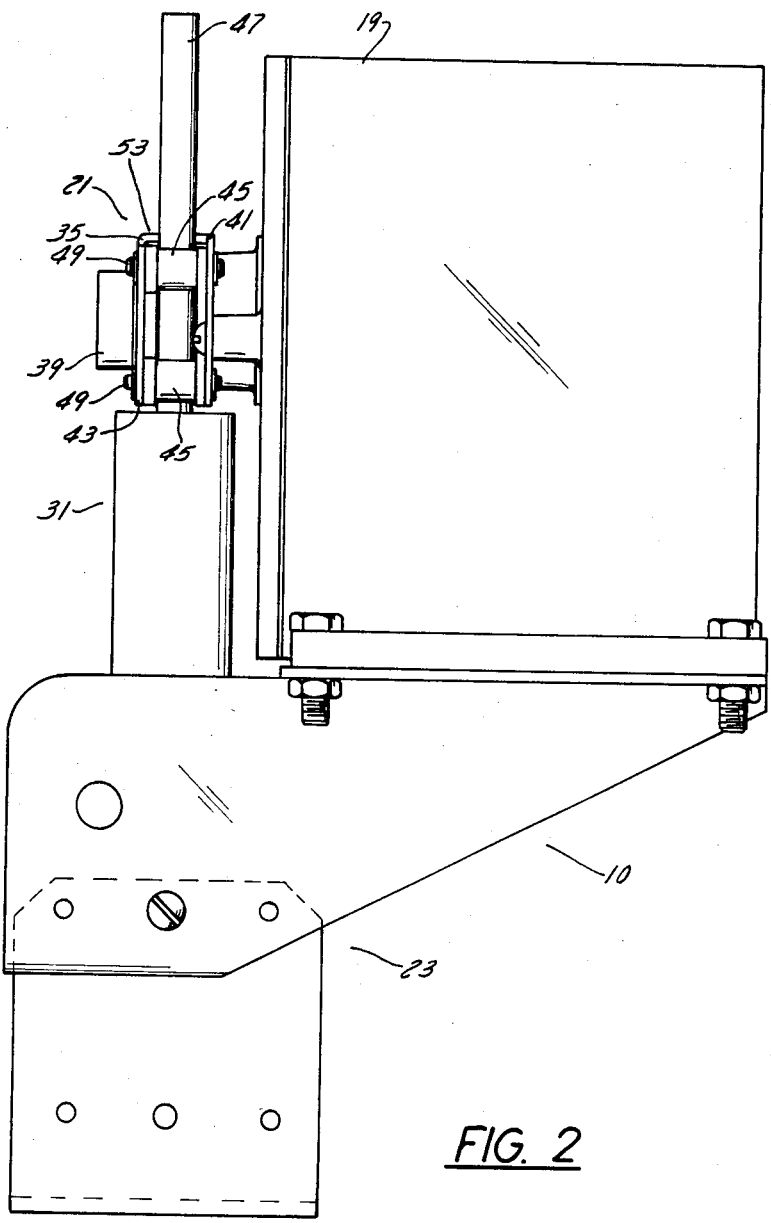
FIG. 2 is a side elevation view of the actuator taken along the plane 2—2 of FIG. 1 and with flow control valve omitted.
Figure 7:
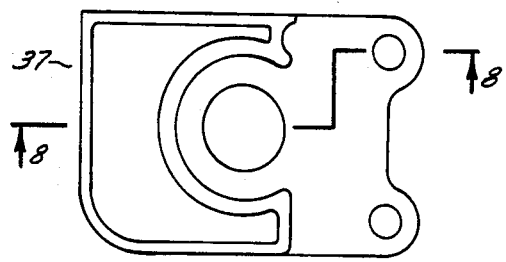
FIG. 7 is a front elevation view of the gear retainer plate portion of the linkage bracket.
Figure 8:
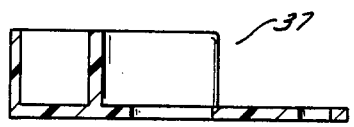
FIG. 8 is a bottom cross-sectional view of the gear retainer plate taken along the planes 8—8 of FIG. 7.

Referring first to FIGS. 1 and 2, the inventive motorized valve actuator 10 is shown in connection with a fluid control valve 11 having an inlet port 13, an outlet port 15 and a stem 17 vertically movable for positioning the internal valving mechanism in a continuum between a fully open and a fully closed position, thereby regulating the flow of fluid through the valve 11. Referring additionally to FIGS. 1, and 3 through 6, the actuator 10 includes a housing 19, an electric drive motor (not shown) contained within the housing 19, a linkage bracket 21 and a valve support bracket 23, each of the brackets 21, 23 being shown as installed in a first orientation. The motor has a protruding, rotatable shaft 25 for providing an actuating force to the valve 11 and having its longitudinal centerline 27 concentric with the large circular aperture 29 formed in the linkage bracket 21. An output member 31 is guided by the linkage bracket 21 while a gear member 33 is received within the linkage bracket 21 intermediate the motor shaft 25 and the output member 31. As described in greater detail below, the gear member 33 is adapted to be mounted in a first or second position. In the first position, the gear member 33 couples the shaft 25 and output member 31 in driving engagement while in the second position, the gear member 33 decouples the output member 31 from the motor shaft 25 and thereby permits the member 31 to be driven by a source of external power.

More particularly, and as best seen in FIGS. 1, 2, 5, 6, 7 and 8, the linkage bracket 21 is shown to include a generally U-shaped linkage plate 35 attachable to the housing 19, a gear retainer plate 37 for receiving and shrouding the gear member 33 and a front cover 39 for retaining the gear member 33 within the linkage bracket 21. The plate 37 has a height shown as the vertical dimension in FIG. 8 selected such that it may be slidably received between the rear panel 41 and the front panel 43 of the linkage plate 35 in closely fitted engagement therewith. A pair of cylindrical molded nylon bearings 45 are interposed between the gear plate 37 and a bearing spacer 46 to support and guide the geared rack 47 of the output member 31. The nylon bearings are supportably retained by pins 49 held by C-clips 51 at either end thereof. Formed within the top surface 53 of the linkage plate 35 is a generally rectangular aperture 55 located to be in registry with the centerline of the output member 31 and valve stem 17 and sized to receive the geared rack 47 of the output member 31 therethrough with a slight perimeter clearance. Slots 57 are formed at the lateral ends of the rear panel 41 for permitting the linkage bracket 21 and the gear member 33 confined therewithin to be aligned concentric with the motor shaft 25.

Referring next to FIGS. 4, 9, 10 and 11, the generally cylindrical, hollow spur gear member 33 includes first means 59 for driving coupling of the shaft 25 and the output member 31 and embodied as regularly spaced gear teeth 61 about its outer periphery and a first end 63 formed to a torque-transmitting profile to mate with the profile formed on the terminus 65 of the motor shaft 25. Those of ordinary skill of the art will appreciate that such a profile may be square as shown or hexagonal or any other torque-transmitting shape and that either the shaft terminus 65 or the gear member 33 may be configured as the male portion. In the preferred embodiment, the motor shaft 25 comprises the male portion and the first end 63 is formed to include an aperture for receiving the shaft terminus 65 and in overlapping engagement therewith. At its second end 67, the gear member 33 includes second, decoupling means embodied as a concentric, circular counterbore 69 having a radius selected to be slightly greater than the radius defined by the shaft longitudinal centerline 27 and any one of the four shaft chamfered corners 71 as shown in FIGS. 3 and 4. When the gear member 33 is mounted within the linkage bracket 21 in a first position, the first end 63 is received on the shaft terminus 65, thereby providing driving coupling of the shaft 25, the gear member 33 and the output member 31. By removing the linkage bracket protective cover 39 and reversing the gear member 33 end for end to a second position, the counterbore 69 is then brought to an overlapping engagement with the shaft terminus 65, thereby permitting the gear member 33 to be freely rotatable with respect to the terminus 65 and yet be driven by an external source of power, a socket wrench for example, to effect positioning of the output member 31 in the event of a motor failure or for initial setup purposes.

Referring additionally to FIG. 1, in the event of such a failure, it is highly desirable to provide for manually setting the valve 11 to a partially open or modulated position so that the HVAC or other system may continue to function reasonably effectively while motor repairs are being made. To that end, the linkage bracket 21 has formed therein a drilled and tapped hole 73 located to be in registry with the teeth 75 of the ouput member rack 47. After the gear member 33 has been placed in its second position and the valve 11 has been manually set for the desired position, a hardened, pointed screw 77 is threaded into the hole 73 to engage the teeth 75 and retain the output member 31 in the selected position. It will be appreciated that the material used to form the front panel 43 should be of sufficient thickness and rigidity to permit such tapping and position retention.

Figure 12:
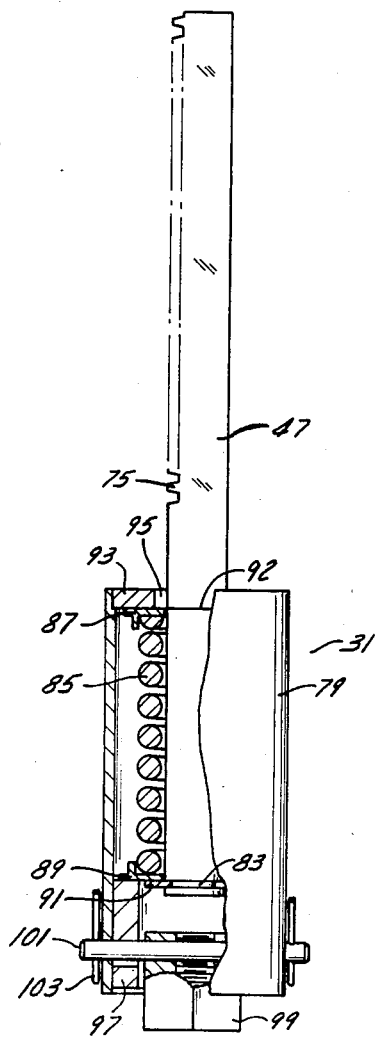
FIG. 12 is a front elevation view of the output member of FIG. 1 with portions shown in cross-section and with other portions broken away.
Figure 9:
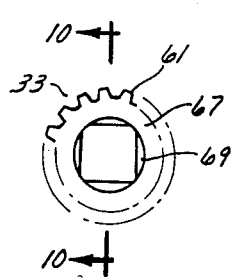
FIG. 9 is a front elevation view of the gear member shown mounted in a first position in partial dotted outline in FIG. 5 and taken along the plane 9—9 thereof.
Figure 10:
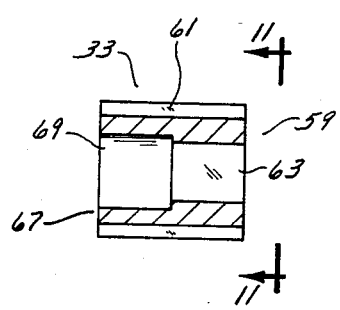
FIG. 10 is a cross-sectional side elevation view of the gear member of FIG. 9 taken along the plane 10—10 thereof.
Figure 11:
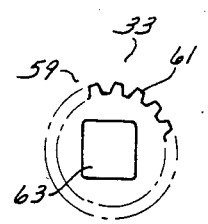
FIG. 11 is a full representation rear elevation view of the gear member of FIG. 9 taken along the plane 11—11 of FIG. 10.

Referring next to FIG. 12, a preferred output member 31 will include means for permitting a slight amount of over travel after the internal valve mechanism is fully seated. It will also include means for readily coupling the output member 31 to the threaded valve stem 17. Accordingly, the output member 31 includes an upper, geared rack 47 or shank having a generally square upper cross-section, a circular lower cross-section and a lower cylindrical barrel 79 for surrounding and protecting the spring 85. A clip retaining groove 83 is formed in the rack 47 adjacent its lower terminus. A coiled spring 85 having a compression preload thereon is confined between a pair of spring cups 87, 89, the lower cup 89 being retained in position by a snap ring 91 received within the groove 83 and the upper cup 87 retentively abutting the shoulder 92 defined by the intersection of the upper and lower sections of the rack 47.

The barrel collar 93 has an aperture 95 selected to be of a sufficiently large diameter so that the barrel 79 including its collar 93 may be freely rotatable with respect to the rack 47. Received within the lower end of the barrel 79 in closely fitted engagement therewith is an annular ring 97, the internal bore of which is sized to receive a hexagonal, internally threaded nut 99. The barrel 79, ring 97 and nut 99 are maintained in a relative position one to the other by a through pin 101 secured at either end by cotter keys 103. The internal thread of the nut 99 is selected to match the thread on the valve stem 17.

During setup for operation and when attaching the actuator 10 to the valve 11 as shown in FIG. 1, the valve gland 105 is received through an opening in the support bracket 23 and held in place thereon by a bushing 106 secured by a lock nut 107. The centerline of the opening is in registry with the vertical longitudinal centerline of the output member 31 and therefore with the linkage plate aperture 55. After the valve 11 is secured to the support bracket 23, the barrel 79 is rotated to thread the nut 99 upon the valve stem 17 and is secured thereon by a lock nut 109. When arranging the actuator 10 for operation, the cover 39 and gear member 33 are removed, the motor is electrically rotated to its zero position and the output member 31 and connected valve stem 17 are moved to the full upward or downward position, depending upon the direction of motor rotation and upon the internal construction of the valve 11, i.e., whether it is desired to be fully open or fully closed with the motor in its zero position. The gear member 33 is then reinserted in a first position and the cover 39 installed. Rotation of the motor shaft 25 in a clockwise direction as viewed in FIG. 1 will cause the output member 31 to move downwardly for valve positioning while counterclockwise rotation would cause upward member movement.

If the valve 11 is of such a construction that it is desired to cause its stem 17 to move upwardly with clockwise motor rotation, the linkage bracket 21 and support bracket 23 may be removed, rotated 180°, and reinstalled, each to a second orientation. When the ouput member 31 is reassembled thereto, the appearance of the linkage bracket 21, output member 31, support member 23 and connected valve 11 will be as a mirror image of that shown in FIG. 1.

While only a single embodiment of the inventive motorized valve actuator 10 has been shown and described, it is not intended to be limited thereby but only by the scope of the claims which follow.

I claim:

1. A motorized valve actuator including:
   an electric drive motor having a rotatable shaft for providing an actuating torque;
   an output member for operating a valve to be coupled thereto;
   a gear member adapted to be manually removably mounted intermediate said shaft and said output member in a first position or in a second position;
   said gear member including an interior, torque transmitting profile for driving coupling of said shaft and said output member when said gear member is mounted in said first position;
   said gear member further including a counterbore for decoupling said output member from said shaft when said gear member is mounted in said second position, thereby permitting said output member to be driven by a source of power external to said actuator and applied to said output member using said torque transmitting profile.

2. The invention set forth in claim 1 wherein said first means includes a plurality of gear teeth for engaging said output member and a first aperture configured to receive said shaft in driven engagement therewith.

3. The invention set forth in claim 1 wherein said counterbore is configured for overlapping engagement with said shaft while yet permitting said gear member to be freely rotatable with respect thereto.

4. A motorized valve actuator for providing an output force along a linear path and including:
   a housing having a linkage bracket attached thereto;
   an electric drive motor contained within said housing and having a rotatable shaft for providing an actuating torque;
   an elongate, geared rack guided by said linkage bracket and adapted for positioning a valve to be coupled thereto;
   a gear member adapted to be received in said linkage bracket in torque transmitting engagement with said shaft and said rack, said gear member including a first end for driving coupling of said shaft, said gear member and said rack when said gear member is installed in said linkage bracket in said first position;
   said gear member being further adapted to be installed in said linkage bracket in a second inverted position with respect to said first position, thereby permitting said gear member and said output member to be driven by a source of power external to said actuator.

5. The invention set forth in claim 4 wherein said drive motor shaft is isolated from said external source of power when said gear member is in said second position.

6. The invention set forth in claim 5 wherein said drive motor shaft includes a terminus formed to a torque-transmitting profile and said first end includes a portion formed to said profile whereby actuating torque may be transmitted from said output shaft through said gear member to said output member.

7. The invention set forth in claim 6 wherein said terminus includes a protruding shaft end and said first end portion includes an aperture for receiving said shaft end in overlapping, torque-transmitting engagement therewith.

8. The invention set forth in claim 4 wherein said actuator further includes means for retaining said output member and a valve coupled thereto in a valve-modulating position when said gear member is in said second position.

9. The invention set forth in claim 7 wherein said actuator further includes means for retaining said output member and a valve coupled thereto in a valve-modulating position when said gear member is in said second position.

10. A motorized valve actuator including:
    a housing;
    an electric drive motor contained within said housing and having a rotatable shaft for providing an actuating force to a valve stem;
    a linkage bracket attachable to said housing in a first orientation or a second orientation, said linkage bracket being adapted to receive a gear member and an output member in driven engagement with said gear member;
    a valve support bracket attachable to said housing in a first orientation or a second orientation;
    said gear member being adapted to be mounted in a first position for permitting driving coupling of said motor shaft, said gear member and said output member, said gear member being further adapted to be mounted in a second position for permitting said gear member and said output member to be driven by a source of external power;
    said valve stem being movable in a first direction when said linkage bracket and said support bracket are attached in said first orientation and said gear member is rotated in a first direction;
    said valve stem being movable in a second direction when said linkage bracket and said support bracket are attached in said second orientation and said gear member is rotated in said first direction.

11. The invention set forth in claim 10 wherein said drive motor shaft is isolated from said external source of power when said gear member is in said second position.

12. The invention set forth in claim 11 wherein said drive motor shaft includes a terminus formed to a torque-transmitting profile and said gear member includes a first end formed to said profile whereby actuating torque may be transmitted from said shaft through said gear member to said output member.

13. The invention set forth in claim 12 wherein said terminus includes a protruding shaft end and said first end includes an aperture for receiving said shaft end in overlapping, torque-transmitting engagement therewith.

* * * * *